W. A. KIRBY.
Harvester.
No. 26,114. Patented Nov. 15, 1859.
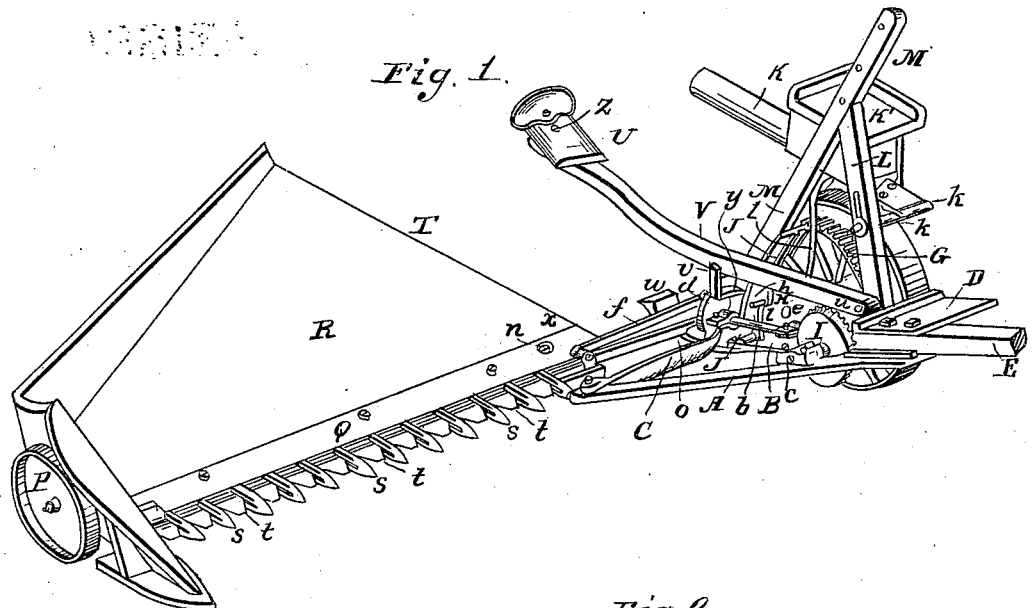
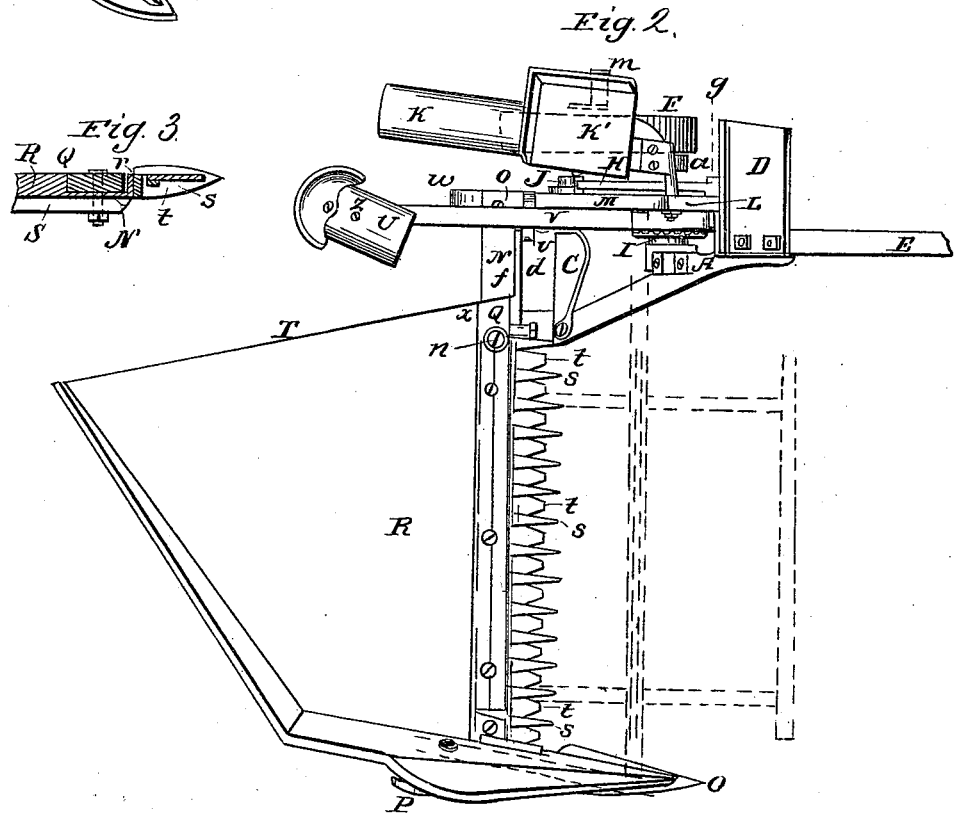

UNITED STATES PATENT OFFICE.

W. A. KIRBY, OF BUFFALO, NEW YORK.

IMPROVEMENT IN HARVESTERS.

Specification forming part of Letters Patent No. 26,114, dated November 15, 1859.

*To all whom it may concern:*

Be it known that I, WILLIAM A. KIRBY, of Buffalo, in the county of Erie and State of New York, have invented certain new and useful Improvements in Combined Harvesting-Machines; and I do hereby declare the following to be a full, clear, and exact description of the construction and operation of the same, reference being had to the accompanying drawings, making a part of this specification, in which—

Figure 1 is a perspective view of the machine. Fig. 2 represents a top plan; and Fig. 3 represents a cross-section taken vertically through one of the guards or fingers and its bar, the cutter and its bar, as also the platform and its bar, showing their relations to each other.

Similar letters of reference, where they occur in the several figures, denote like parts of the machine in all of them.

My invention relates more especially to that class of mowing and reaping machines known as "combined harvesters"—that is to say, a machine which possesses within itself all the necessary elements to make it either a mowing or reaping machine, as circumstances may require.

The general characteristics of much of this machine may be found in the patent granted to me on the 2d day of September, 1856, to which reference is made for those parts not more clearly and distinctly set forth in this specification.

The nature of my invention consists, first, in the special arrangement and location of the raker's seat—viz., in the angle formed by the delivery side or edge of the platform and the finger-bar.

In combined reapers and mowers the changes that are made to convert the machine from one purpose to the other are not always uniform, and therefore the machine must have such susceptibilities of change as will best adapt it to the nature and condition of the ground and of the crop. In cutting grain the reel, as a general thing, is always used; but when the grain is much tangled the reel becomes comparatively useless from its inability to disentangle the stalks. In such a condition of the standing crop I remove the reel, and the grain is gathered and drawn to the cutters by the raker from his seat, who reaches forward with his rake and draws the grain to the cutters in such quantities as the machine may be able to properly sever. This condition requires the raker to have a position that will give him the necessary facilities for doing this work; but when the grain stands in good condition, then the reel is used, and the raker's seat must then be in a good position to enable the raker upon it to clear the platform of the cut grain and leave it in a windrow behind the machine and out of its path on the return swath. Another and an important requisite in the arrangement and location of the raker's seat, besides that of counterbalancing the driver on his seat, and thus giving an easy motion to the draft of the machine, consists in giving the raker such advantages of holding and bracing himself in the seat as that the sudden jars to which the machine is constantly subjected when in operation shall not throw him forward into the line of the cutters—a matter very liable to happen unless proper precautions be taken to avoid it.

When the machine is converted into a mower the reel, the platform, and the raker's seat may and probably would be dispensed with, though the former (the reel) is often used in mowing. When this change is made the machine should still possess the requisities of being properly balanced and controlled and free from side draft, and still have the strength to sustain itself without the extra weight and strength it would require as a reaper. Such an arrangement and location and combination of parts therefore must be made as will best adapt the machine to these many changes and contingencies, and to this end much study and experiment had to be made to effect the object and purposes aimed at.

To enable others skilled in the art to make and use my invention, I will proceed to describe the same with reference to the drawings.

A B represents two sides of a metallic frame, which may be cast in one piece; and C, a tie-piece near their rear ends, which forms a triangular frame, said tie-piece being curved or inclined upward so as to pass over and not tangle or drag the cut grain or grass. To the front part of this frame is fastened the foot-board D for the driver, and the tongue E.

F is the driving-wheel, as also the supporting-wheel, and is placed outside of the frame A B C, or so that the outside of the frame, should it for any purpose be carried around said wheel, need not be supported on the wheel on that side. The wheel F carries a cogged rim, G, which drives a pinion, $a$, on a shaft, $c$, which is supported in suitable boxes on the two pieces A B of the frame. On this same shaft $c$ is hung a plate, H, to which the journal or axle $e$ of the main wheel F is firmly attached, so that said plate and wheel may vibrate on said shaft $c$ as a center, which allows the cogged rim G to roll on the pinion $a$, said pinion also having the shaft $c$ for its center, and consequently they are always in gear with each other. On the inner end of the shaft $c$ there is a bevel-gear, I, which takes into a bevel-pinion on the shaft $b$ and gives it motion, and on the rear end of this shaft $b$ there is a crank-wheel, $d$, to which the pitman $f$, that drives the cutters, is attached. A curved rim, J, is firmly connected to the frame B, and has a flanged way or groove in it, through which the perimeter of the plate H traverses to keep it steady, the front portion of said plate being also steadied or guided in its traversing by a similar contrivance, (seen at $g$, Fig. 2.) There are a series of holes in the plate H, through either of which an adjusting-pin, $h$, is placed, and when the projection $i$ on the rim comes in contact with said pin it defines the extent of motion of the frame on the wheel in a downward direction.

K is the driver's seat when mowing, and K' his seat when reaping, he being moved forward when the raker is on his seat to better balance the machine. The driver's seat is hinged to a stud or arm, $k$, that is adjusted and made fast in the post L, and is further supported by a rod or bent bar, $l$, extending up to its under side from the journal or axle $e$ on each side of the main wheel F. When the driver sits at K' his feet are on the foot-board D; but when he sits at K his left foot is on the brace or stirrup $m$ on the outside of the wheel F, said stirrup being either connected to the bar $l$ or to the axle $e$, or to some other piece or part in that locality. It will be perceived that the driver's seat is not parallel with the face or vertical plane of the wheel, but that its rear is farther from the platform than its front portion. This arrangement not only better balances and distributes his weight, but allows him to sit more facing to the reel to watch obstructions there, while it does not prevent him also from watching the team.

To the rim J there is firmly bolted a reel-post, M, said reel-post projecting forward from its point of attachment, and the post L is framed into said reel-post, and thus serves as a brace to support it. The outside reel-post is shown in red lines in Fig. 2, but is not shown in Fig. 1. It is fastened to the outside shoe or divider, and also inclines forward, so as to afford with the post M proper supports for the reel, which is also shown in red lines in Fig. 2.

N is the finger-bar, which is fastened to the main frame at the points $n$ $o$. This finger-bar is formed of a piece of flat iron, with a flange $r$, Fig. 3, turned up upon it, which gives it strength and allows the fingers to be attached thereto by horizontal bolts or rivets, and other advantages which will be presently referred to. $t$ are the cutters, and $o$ the outside divider, with an outer supporting-wheel, P, said wheel and divider being removed at times and a shoe of a special kind substituted for them; but as said shoe will form the subject-matter of another application for Letters Patent, it need not be more particularly referred to here.

Q is the platform-beam, to which the platform R is attached, and both the platform and platform-beam are removable, and are removed when the machine is mowing. Now, the finger-bar N has strength enough to sustain all its parts when mowing; but when the machine is converted into a reaper it has much more resistance to withstand, and the finger-bar should be strengthened for this purpose. I lay the platform-bar Q on top of the finger-bar N and bolt them together, by which means they strengthen and support each other, the recess caused by turning up the flange $r$ making the proper kind of place for the admission of the platform-bar. By this arrangement the machine, when a mower, becomes very light, yet strong enough for that purpose; and when it is a reaper it is proportionately strengthened to resist the increased work it has to encounter.

S are sills underneath the platform, to which the boards of which it is composed are nailed.

T is the delivery side of the platform. It forms, with the finger-bar, an angle of about eighty degrees, leaving a widened space in rear of the frame or an obtuse angle, over which widened space or angle is located the raker's seat U, as follows:

V is a beam, which may, for convenience, be slightly curved, as shown. It is pivoted to the post L at $u$, and thence extending rearward is supported at $v$ by an iron, (which I call a "stirrup-iron,") that is fastened to the rim J. To its extreme rear portion is secured the raker's seat U, as shown in the drawings, Fig. 2, it occupying a central position in the obtuse angle formed by the receding of the side T of the platform. The raker in this seat braces himself against the jarrings of the machine by placing his left foot against the brace $w$ and his right foot against the platform at about the point $x$ thereon, and in this position he faces toward the reel, which enables him to rake in tangled grain, as above mentioned, or to clear the platform of the cut grain, which is his main duty when the grain is being reeled in. When the driver sits at K his left foot, as heretofore mentioned, is in the outer stirrup, $m$, and his right foot in the stirrup $y$, which, together with the fact of his sitting astride of his seat, gives him a great degree of firmness in his seat. This also may be said of the raker, who is similarly braced in his seat. These considerations may not be deemed important by those who have not seen the danger of the rider on the machine being thrown forward into the line of the cutters.

To leave the machine with all its requisites and yet to dispense with all superfluous weight or parts requires much labor and thought.

That the seat U may be properly fixed to suit the best position of the raker for facility in working his rake, it may be secured to its beam by a single screw-bolt, $z$, so that it may be turned on its beam to suit the occupant. It will be seen that by the peculiar location of the raker's seat over the open space at the side of the platform, and the manner of hanging said seat so as not to incumber the clear space in any way over which it is suspended, the raker can deliver the gavel at any portion of the side of the platform most convenient to himself, whether in front, opposite, or in rear of his position, and thus enabling him to change his point of delivery and much relieve himself by changing the sweep of his body and arms in his laborious task. It also enables the raker to more readily seize with his rake the cut grain whatever may be its position on the platform, for when the grains leans it falls sometimes in one position and at other times in different positions; but in all or any of its positions, with his location and facility for delivering the grain, he accomplishes his work with ease.

Having thus fully described the nature and object of my invention, what I claim therein as new, and desire to secure by Letters Patent, is—

Locating the raker's seat over the open space at the side of the platform, so that the delivery may be at any point along the whole side of said platform that the raker may desire, substantially as herein described and represented.

WM. A. KIRBY.

Witnesses:
A. B. STOUGHTON,
THOS. H. UPPERMAN.